(12) United States Patent
Hirota et al.

(10) Patent No.: US 6,860,294 B2
(45) Date of Patent: Mar. 1, 2005

(54) FOUR-WAY SWITCHING VALVE

(75) Inventors: Hisatoshi Hirota, Tokyo (JP); Tokumi Tsugawa, Tokyo (JP); Katsumi Koyama, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 118 days.

(21) Appl. No.: 10/360,493

(22) Filed: Feb. 7, 2003

(65) Prior Publication Data

US 2003/0155020 A1 Aug. 21, 2003

(30) Foreign Application Priority Data

Feb. 21, 2002 (JP) ........................................ 2002-044183

(51) Int. Cl.[7] .............................................. F16K 11/20
(52) U.S. Cl. .............................. 137/625.43; 137/596.17
(58) Field of Search ........................ 137/596.17, 625.43

(56) References Cited

U.S. PATENT DOCUMENTS

| | | | |
|---|---|---|---|
| 2,888,039 A | 5/1959 | Tilney | |
| 2003/0000586 A1 * | 1/2003 | Hirota et al. | 137/625.43 |
| 2003/0159739 A1 * | 8/2003 | Hirota et al. | 137/625.43 |

FOREIGN PATENT DOCUMENTS

EP          1 273 837 A1     1/2003

OTHER PUBLICATIONS

Abstract of Japanese Publication 2003–083458, Published Mar. 19, 2003.

* cited by examiner

Primary Examiner—Gerald A. Michalsky
(74) Attorney, Agent, or Firm—Patterson, Thuente, Skaar & Christensen, P.A.

(57) ABSTRACT

To provide a four-way solenoid valve having a three-way solenoid valve of which non-concentricity between a valve element and a valve hole is small, if any. A core of a three-way solenoid is integrally formed with a refrigerant passage extending axially therethrough, an annular projection forming a valve seat, and a guide for guiding reciprocating motion of a needle forming a valve element. A plug closing a cylinder of a body to define the pressure control chamber is also integrally formed with a valve seat and a guide for guiding reciprocating motion of a needle forming a valve element associated with the valve seat. This causes the needles to be seated on the valve seats associated therewith in respective states guided by the guides substantially concentric with the valve holes, which makes it possible to impart sufficient sealing properties to the valve portions when each valve is closed.

8 Claims, 10 Drawing Sheets

FOUR-WAY SWITCHING VALVE

CROSS-REFERENCES TO RELATED APPLICATIONS, IF ANY

This application claims priority of Japanese Application No. 2002-044183 filed Feb. 21, 2002 and entitled "Four-Way Switching Valve".

(1) Field of the Invention

This invention relates to a four-way switching valve, and more particularly to a four-way switching valve which carries out switching of refrigerant lines e.g. in a heat pump-type heating and cooling system for an automotive vehicle when the system is switched between a cooling operation mode and a heating operation mode.

(2) Description of the Related Art

In a heating and cooling system for an automotive vehicle, a refrigeration cycle is employed when cooling operation is performed, and engine coolant is used as a heat source when heating operation is performed. Recently, however, due to the improvement in combustion efficiency of the engine, the temperature of the coolant does not rise high enough to obtain sufficient heating temperature in winter. For this reason, there is an increasing need for a system which can perform both cooling and heating. In a heating and cooling system of this kind, it is necessary to reverse the direction of flow of refrigerant flowing through an indoor heat exchanger and an outdoor heat exchanger, as the system is switched between cooling and heating operations. It is a four-way switching valve that switches the direction of flow of the refrigerant.

FIG. 10 is a diagram showing the arrangement of a heating and cooling system using the four-way switching valve.

The heating and cooling system is comprised of a compressor 101, a four-way switching valve 102, an outdoor heat exchanger 103, a pressure-reducing device 104, an indoor heat exchanger 105, and an accumulator 106. The four-way switching valve 102 has four ports A to D. The port A is connected to a delivery side of the compressor 101, the port B to the outdoor heat exchanger 103, the port C to the indoor heat exchanger 105, and the port D to the accumulator 106.

During cooling operation, the four-way switching valve 102 is switched such that the port A and the port B are communicated with each other and the port C and the port D are communicated with each other, as indicated by solid lines in the figure. Therefore, a high-temperature and high-pressure refrigerant compressed by the compressor 101 flows into the port A of the four-way switching valve 102, and sent from the port B to the outdoor heat exchanger 103, where the refrigerant is caused to undergo heat exchange to be condensed or cooled, and then adiabatically expanded to a low-temperature and low-pressure refrigerant by the pressure-reducing device 104. The indoor heat exchanger 105 causes the low-temperature and low-pressure refrigerant to exchange heat with warm air in the compartment to evaporate. Then, the refrigerant flows through the port C and the port D of the four-way switching valve 102 to enter the accumulator 106, where it undergoes gas/liquid separation, and the refrigerant gas is returned to the compressor 101.

On the other hand, during heating operation, the four-way switching valve 102 is switched such that the port A and the port C are communicated with each other and the port B and the port D are communicated with each other, as indicated by broken lines in the figure. Therefore, the high-temperature and high-pressure refrigerant compressed by the compressor 101 flows through the port A and the port C of the four-way switching valve 102 to enter the indoor heat exchanger 105, where the refrigerant exchanges heat with cool air in the compartment to heat the same. The refrigerant condensed or cooled by the indoor heat exchanger 105 is adiabatically expanded to the low-temperature and low-pressure refrigerant by the pressure-reducing device 104. Then, the refrigerant undergoes heat exchange at the outdoor heat exchanger 103 to evaporate, and then passes through the port B and the port D of the four-way switching valve 102 to flow into the accumulator 106, where the refrigerant is separated into gas and liquid, followed by returning to the compressor 101.

As described above, the four-way switching valve 102 can switch the operation mode of the heating and cooling system, by switching the flow path of refrigerant.

As the four-way switching valve 102, there is one proposed in Japanese Patent Application No. 2001-268492 by the present applicant. This four-way switching valve is comprised of a first plug for switching the communication of the port B leading to the outdoor heat exchanger 103 such that the port B is communicated with the port A to which high-pressure refrigerant is introduced or with the port D from which low-pressure refrigerant is sent out, a second plug for switching the communication of the port C leading to the indoor heat exchanger 105 such that the port C is communicated with the port A into which the high-pressure refrigerant is introduced or with the port D from which the low-pressure refrigerant is sent out, first and second pistons for actuating these first and second plugs to perform switching operation, and a three-way solenoid valve for switching pressure in pressure control chambers for the first and second pistons between high pressure and low pressure.

This enables the three-way solenoid valve to switch the communication of the pressure control chamber for the first or second piston such that the pressure control chamber is communicated with the port A into which the high-pressure fluid is introduced or with the port D from which the low-pressure fluid is sent out, thereby making it possible to switch between a first state in which the port A is communicated with the port B, and the port C is communicated with the port D, and a second state in which the port A is communicated with the port C, and the port B is communicated with the port D.

The conventional three-way solenoid valve for the four-way switching valve is configured such that balls forming valve elements are secured to axially both end faces of a plunger which is reciprocatingly moved within a sleeve, and valve seats are formed on a core side and a casing side in a manner opposed to these balls, respectively, and the sleeve guides the plunger when either ball is seated on an associated one of the valve seats. However, the sleeve accommodating the plunger in a reciprocatingly movable fashion is brazed to the casing to ensure gastightness, and this sometimes results in non-concentricity between the ball secured to the plunger and the valve seat formed in the casing, making the sealing of the valve portion insufficient when the valve is closed.

One possible method to cope with this inconvenience is to provide a certain gap between the sleeve and the plunger, such that when the ball is seated on the associated valve seat, if the ball abuts on an opening edge of a valve hole in a state out of concentricity, self-centering is effected by the ball moving following the opening edge of the valve hole.

However, when the switching operation is performed by energization of the coil, the plunger is sometimes seated on the valve seat provided on the core side, in a state attracted to the sleeve, which causes the non-concentricity, to the contrary, and an indentation can be formed on the opening edge of the valve hole by the ball, which makes the sealing of the valve portion insufficient when the valve is closed.

SUMMARY OF THE INVENTION

The present invention has been made in view of these points, and an object thereof is to provide a four-way solenoid valve having a three-way solenoid valve of which non-concentricity between a valve element and a valve hole is small, if any.

To solve the above problem, the present invention provides a four-way switching valve including a first plug and a second plug arranged in a first cylinder and a second cylinder formed in a body in parallel with each other, respectively, such that the first plug and the second plug are capable of axial reciprocating motion, the first plug and the second plug each having axially both ends forming valve elements and performing switching of fluid passages, a first piston and a second piston for actuating the first plug and the second plug, respectively, and a three-way solenoid valve causing a pressure control chamber for the first piston to be selectively communicated with a space into which high-pressure fluid is introduced or a space into which low-pressure fluid is introduced, characterized in that the three-way solenoid valve comprises a first valve element and a second valve element arranged in an axial direction of a plunger as respective two separate parts, for reciprocating motion, a first valve seat having a guide for guiding said first valve element and a valve hole concentric with said guide both arranged at respective axial positions of the plunger, and a second valve seat having a guide for guiding said second valve element and a valve hole concentric with said guide both arranged at respective axial positions of the plunger.

According to this four-way switching valve, the valve element of three-way solenoid valve is divided in two separate valve elements, and valve seats associated with the respective valve elements are each formed by a single component having a guide for guiding the valve element and a valve hole concentric with the guide. This causes the seating of the valve element to be performed by the guiding of the guide, thereby preventing each valve element and the valve hole associated therewith from becoming non-concentric when the valve element is seated, and hence, no defective sealing occurs when the valve is closed.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a longitudinal sectional view showing the four-way switching valve according to the first embodiment of the invention, in a switching position taken when its solenoid is ON.

FIG. 7 is a longitudinal sectional view showing the four-way switching valve according to the third embodiment of the invention, in a switching position taken when its solenoid is ON.

FIG. 9 is a longitudinal sectional view showing the four-way switching valve according to the fourth embodiment of the invention, in a switching position taken when its solenoid is ON.

DESCRIPTION OF THE PREFERRED EMBODIMENTS

Hereinafter, an embodiment of the present invention will be described in detail with reference to drawings, by taking, as an example, a case of the present invention being applied to a heat pump-type heating and cooling system for an automotive vehicle.

Figure 1:
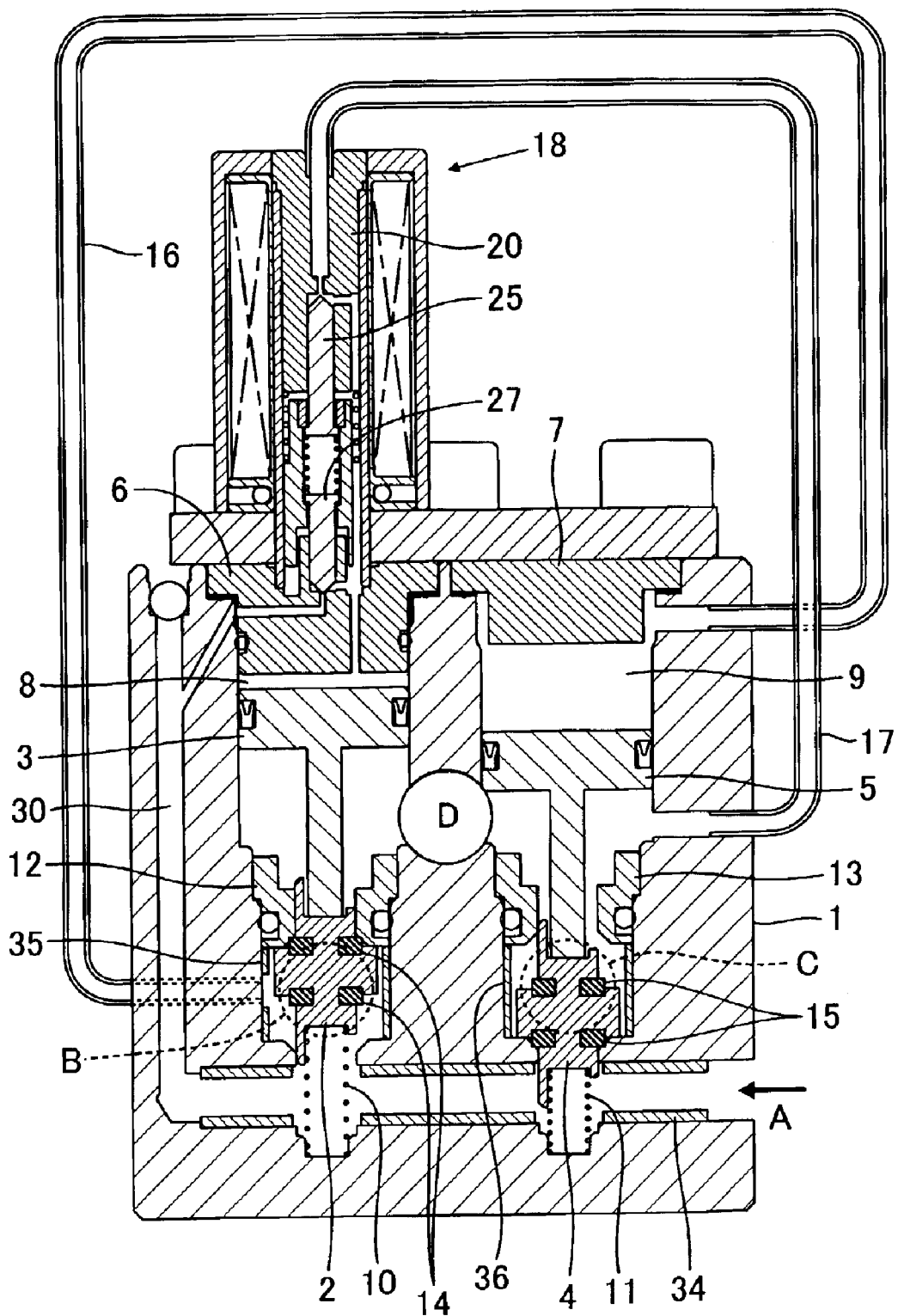
FIG. 1 is a longitudinal sectional view of a four-way switching valve according to a first embodiment of the invention, in a switching position taken when its solenoid is OFF.
Figure 2:
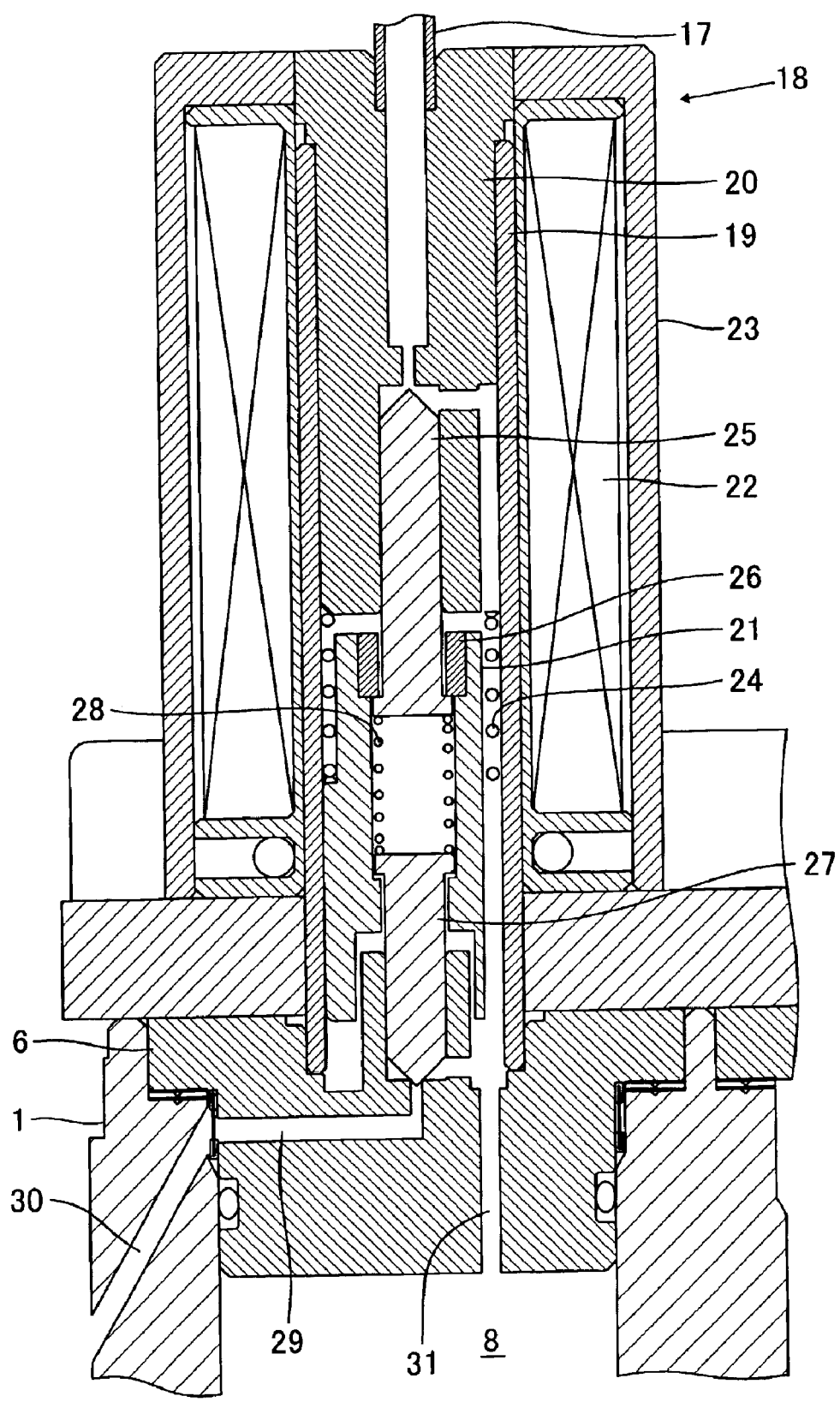
FIG. 2 is a longitudinal cross-sectional view showing a solenoid valve in detail.
Figure 3:
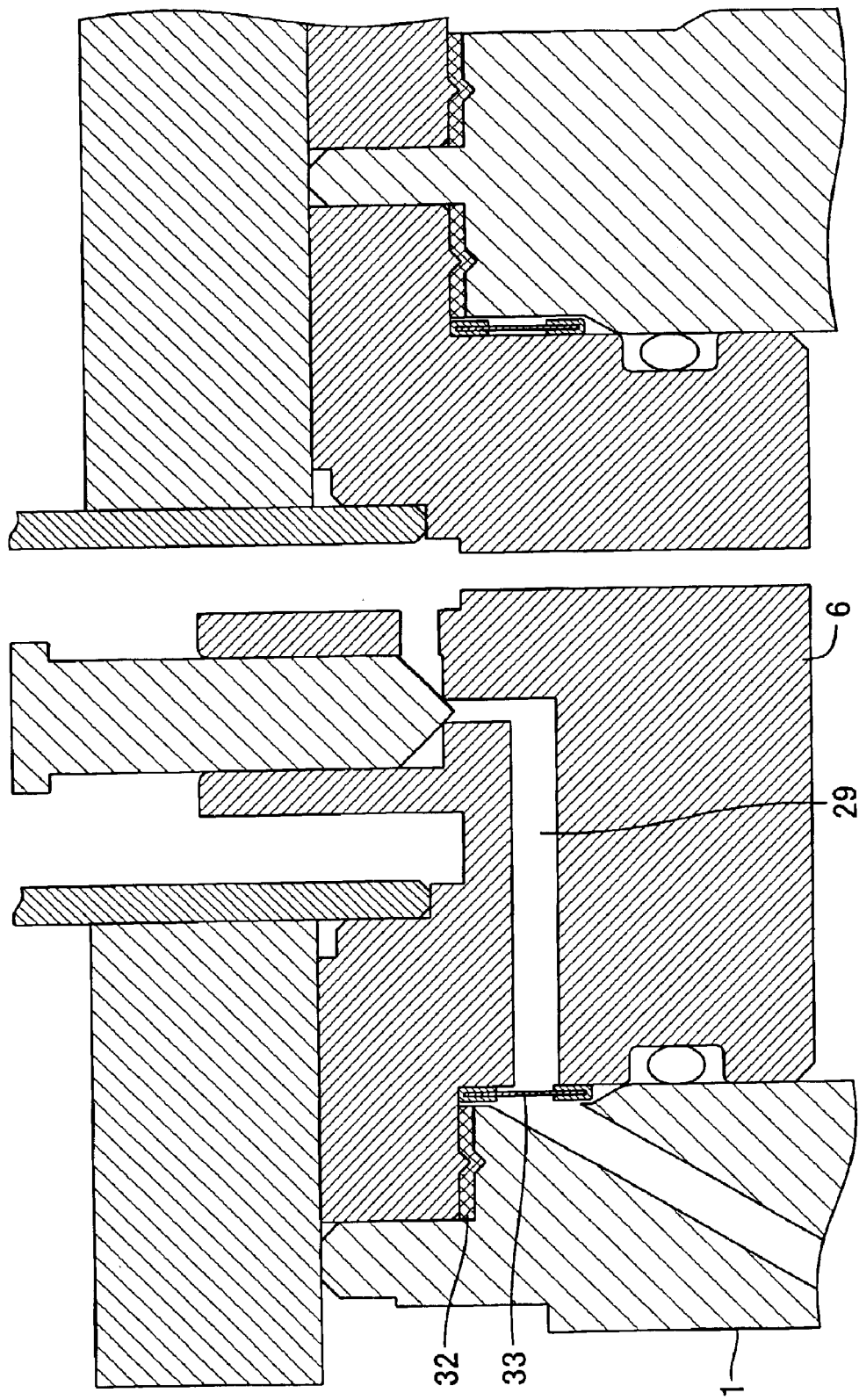
FIG. 3 is a longitudinal cross-sectional view showing a plug formed integrally with the solenoid valve on an enlarged scale in detail.
Figure 4:
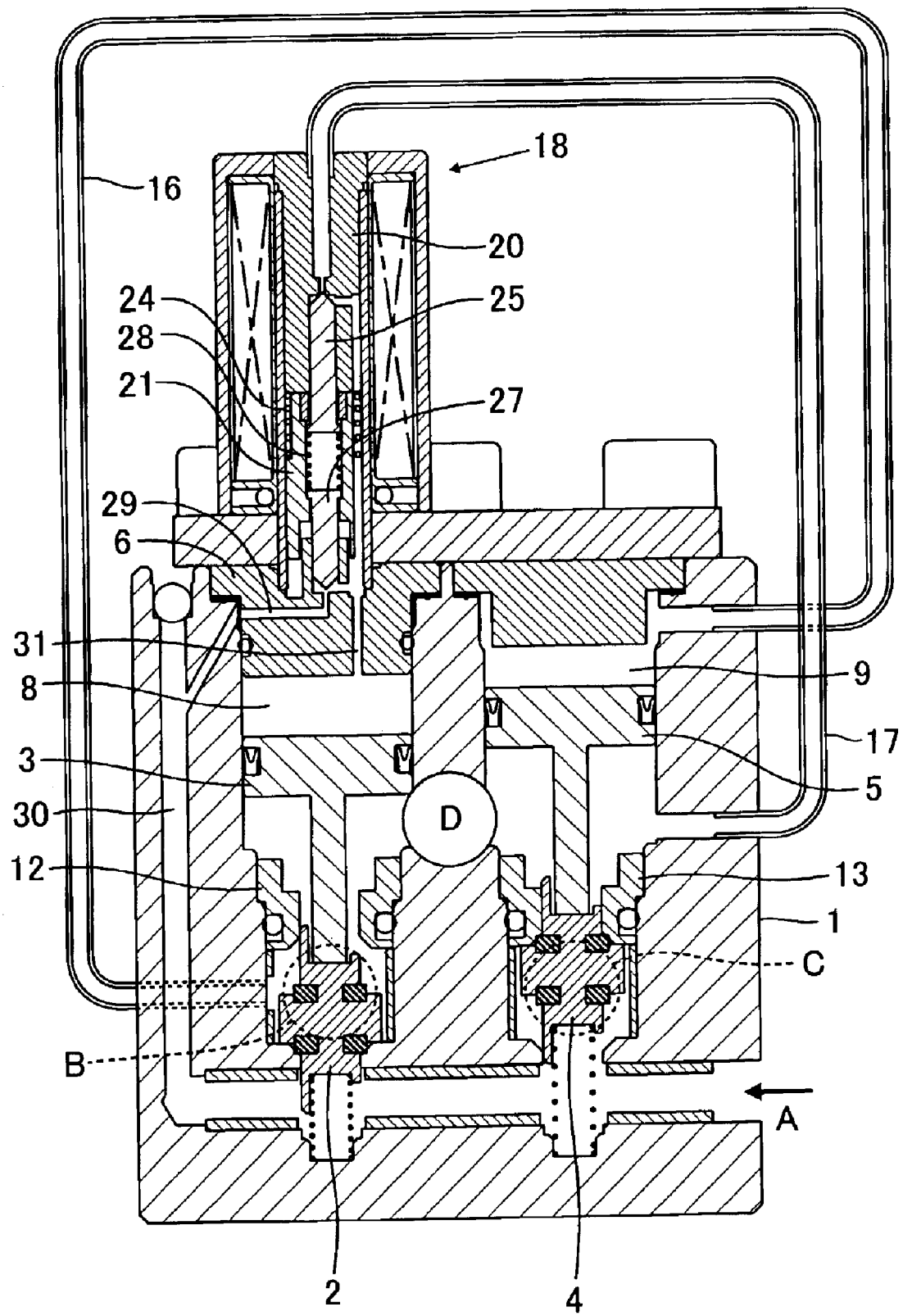

FIG. 1 is a longitudinal sectional view of the four-way switching valve according to a first embodiment of the invention, in a switching position taken when its solenoid is OFF. FIG. 2 is a longitudinal cross-sectional view showing details of a solenoid valve. FIG. 3 is a longitudinal cross-sectional view showing a plug integrally formed with the solenoid valve on an enlarged scale in detail, and FIG. 4 is a longitudinal sectional view of the four-way switching valve according to the first embodiment of the invention, in a switching position taken when its solenoid is ON.

To implement the four-way switching valve, in the heat pump-type heating and cooling system, a port A formed in a body 1 is connected to piping for receiving a high-pressure refrigerant delivered from a compressor, a port B is connected to piping which leads to an external heat exchanger, a port C is connected to piping which leads to an internal heat exchanger, and a port D is connected to low-pressure refrigerant piping which leads to the suction side of the compressor.

The four-way switching valve has the body 1 having two cylinders formed therein. In the two cylinders, a plug 2 and a piston 3, and a plug 4 and a piston 5 are arranged, respectively, in parallel with each other, such that they can reciprocate in a vertical direction as viewed in the figures. Portions of the cylinders above the pistons 3, 5 are closed by a plug 6 and a cap 7, respectively, to define pressure control chambers 8 and 9, between the plug 6 and the piston 3, and between the cap 7 and the piston 5, respectively. The pistons 3 and 5 are integrally formed with axially extending shafts whose ends are in abutment with upper surfaces of the plugs 2 and 4, respectively. The plugs 2 and 4 are urged by springs 10 and 11, upward as viewed in the figure, respectively.

The plugs 2 and 4 each have portions serving as valve elements on axially both sides thereof. Annular projections, which are integrally formed with the body 1 in a manner protruding into respective intermediate portions of passages communicating the port A with the ports C, B, form valve seats on which the plugs 2 and 4 are seated when the plugs 2 and 4 move downward as viewed in the figures. Further, plugs 12, 13 fitted in respective intermediate portions of passages communicating the ports C, B with the port D, form valve seats on which the plugs 2 and 4 are seated when the plugs 2 and 4 move upward as viewed in the figures. These plugs 2, 4 have seal rings 14, 15 fitted on portions thereof via which they are seated on the valve seats.

Thus, the inside of the body 1 of the four-way switching valve is constructed as a combination of a three-way switching valve that switches to cause the port B to communicate with the port A or the port D, and a three-way switching valve that switches to cause the port C to communicate the port A or the port D.

A space communicating with the port B is connected to the pressure control chamber 9 via a tube 16 such that the space communicates with the chamber 9. Further, the four-way switching valve includes a three-way solenoid valve 18 for selectively causing the pressure control chamber 8 to communicate with either a space communicating with the port A into which the high-pressure refrigerant is introduced or with a space communicating via a tube 17 with the port D from which the low-pressure refrigerant is sent out.

The three-way solenoid valve 18 includes, as shown in FIG. 2, a core 20 fixed to a sleeve 19 in a manner closing an upper end of the sleeve 19, a plunger 21 arranged in a manner capable of axial reciprocating motion within the sleeve 19, a coil 22 arranged outside the sleeve 19, a yoke 23 arranged outside the coil 22, and a spring 24 arranged between the core 20 and the plunger 21. The core 20 is formed with a refrigerant passage axially extending therethrough, and an annular projection forming a valve seat is integrally formed therewith at an intermediate portion of the refrigerant passage. The refrigerant passage extending through the core 20 has an upper end opening thereof connected via the tube 17 to the low-pressure chamber communicating with the port D.

Within the refrigerant passage of the core 20, a needle 25 forming a valve element is arranged opposed to the annular projection from below, as viewed in the figure, in a manner capable of axial reciprocating motion. The core 20 causes a portion having the needle 25 arranged therein to act as a guide along which the needle 25 performs reciprocating motion. The guide is thus configured to be integrally formed with the annular projection forming the valve seat, such that the guide and the annular projection are formed in one component, whereby the needle 25 is arranged substantially concentric with respect to the valve hole formed in the center of the annular projection. The needle 25 has a lower end thereof inserted into a hole axially formed through the plunger 21, and when the valve is opened, the needle 25 is latched by a stopper 26 fitted in an upper end opening of the hole of the plunger 21 and caused to move downward.

Further, a needle 27 is arranged within the hole axially extending through the plunger 21, in a manner capable of axial reciprocating motion. The needle 27 is held by an annular projection integrally formed with the plunger 21 in a manner protruding into an intermediate portion of the hole, thereby being prevented from moving out of the hole.

Further, the needle 25 and the needle 27 are urged by a spring 28 interposed therebetween, in respective axially opposite outward directions.

The needle 27 has a lower end thereof arranged in a manner opposed to a valve seat formed on the plug 6. The plug 6 is formed with a hollow cylindrical projection extending from an upper end face thereof, for guiding the needle 27, and a valve hole formed coaxially with the projection. This valve hole is communicated with a passage 29 extending from a peripheral surface of the plug 6, and the passage 29 is communicated with a high-pressure passage 30 formed through the body 1 such that the high-pressure passage communicates with the port A. Further, a lower end of the sleeve 19 is welded to the plug 6, and a passage 31 communicating with the pressure control chamber 8 is formed through the plug 6.

This plug 6 is, as shown in detail in FIG. 3, is fitted via a gasket 32 in an upper end opening of one of the cylinders formed in the body 1, and an opening at an end of the passage 29 communicating with the valve hole is provided with a hollow cylindrical strainer 33, for preventing foreign matters contained in the refrigerant from flowing to the needle valve.

Further, the four-way switching valve has a heat-insulating sleeve 34 provided inside the passage into which the high-temperature high-pressure refrigerant is introduced, and heat-insulating sleeves 35,36 provided inside the cylinders in which the plugs 2, 4 are arranged, thereby suppressing heat conduction via the body to the space communicating with the low-temperature low-pressure port D.

In the four-way switching valve constructed as above, when the three-way solenoid valve 18 is in a deenergized state, i.e. when its solenoid is OFF, as shown in FIG. 1, the plunger 21 of the three-way solenoid valve 18 is urged by the spring 24 and moved downward, as viewed in the figures, whereby the upper needle 25 is pulled downward by the stopper 26 fitted in the plunger 21, while the lower plunger 27 is urged downward by the spring 28 provided in the plunger 21, to be thereby seated on the valve seat formed in the plug 6. Thus, the three-way solenoid valve 18 causes the pressure control chamber 8 to be communicated with the low-pressure port D via the passage 31 formed through the plug 6, respective grooves longitudinally formed on the outer peripheries of the plunger 21 and the core 20, a passage extending from a peripheral surface of the core 20 to a space on the needle 25 side of the annular projection forming the valve seat, the valve hole formed in the center of the annular projection, the refrigerant passage in the core 20, and the tube 17, and the lower needle 27 blocks the passage 29 communicated with the space of the high-pressure port A.

At this time, the pressure within the pressure control chamber 8 is reduced since it is communicated with the space of the low-pressure port D, via the three-way solenoid valve 18, while the port A is supplied with the high-pressure refrigerant. This causes the plug 2 and the piston 3 to be pushed and moved upward as viewed in the figures, whereby the plug 2 is seated on the plug 12 and at the same time moved away from the annular projection of the body 1. While this increases the pressure in the space in which the plug 2 is arranged, the pressure in the pressure control chamber 9 is also made as high as that in the space due to supply of the high pressure thereof via the tube 16. This causes the piston 5 having a larger pressure-receiving area than that of the plug 4 to be pushed and moved downward as viewed in the figures, whereby the plug 4 is seated on the annular projection of the body 1 and at the same time moved away from the plug 13. As a result, the port A is communicated with the port B, and the port C is communicated with the port D. In other words, the heating and cooling system for an automotive vehicle is placed in a cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, when the solenoid is turned ON, as shown in FIG. 4, the three-way solenoid valve 18 has the plunger 21 thereof attracted to the core 20 against the urging force of the spring 24, so that the upper needle 25 is pushed upward by the spring 28 arranged within the plunger 21 and seated in the valve seat formed in the core 20, while the lower needle 27 has its flange at an upper end thereof latched by the annular projection formed in the plunger 21 to be thereby moved upward. Thus, the three-way solenoid valve 18 blocks the tube 17 communicating with the low-pressure space, and causes the pressure control chamber 8 to be communicated with the space of the high-pressure port A via the passage 31 of the plug 6, a passage extending a peripheral surface of the hollow cylindrical projection for guiding the needle 27 to the space formed on the needle 27 side of the portion forming the valve seat, the valve hole, the passage 29, and the high-pressure passage 30.

Due to introduction of the high-pressure refrigerant into the pressure control chamber 8, the piston 3 is pushed and moved downward as viewed in the figures. At the same time, the plug 2 as well is pushed and moved downward to be inserted into the valve hole communicating with the passage for the high-pressure refrigerant, so that the pressure in the space in which the plug 2 is arranged is reduced. Simultaneously with this, the pressure in the pressure control chamber 9 is also reduced via the tube 16, so that the plug 4 and the piston 5 are moved upward, as viewed in the figures, by the high-pressure refrigerant introduced from the port A. In due time, the plug 2 is seated on the associated annular projection formed in the body 1, and at the same time moved away from the plug 12, while the plug 4 is moved away from the associated annular projection formed in the body 1 and seated on the plug 13. As a result, the port A is communicated with the port C, and the port B is communicated with the port D. In other words, the heating and cooling system for an automotive vehicle is switched to a heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 5:
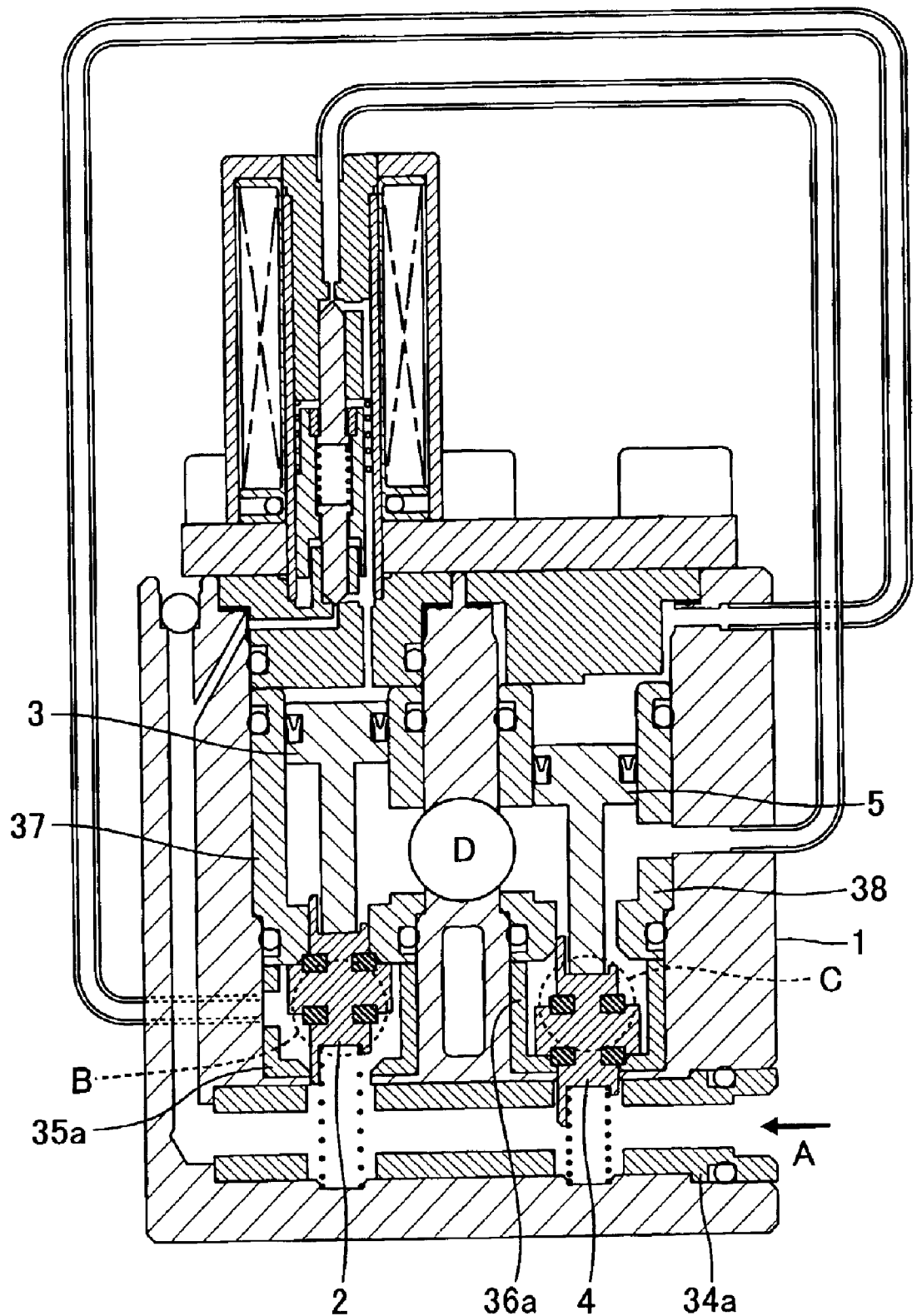
FIG. 5 is a longitudinal sectional view of a four-way switching valve according to a second embodiment of the invention, in a switching position taken when its solenoid is OFF.

FIG. 5 is a longitudinal sectional view of a four-way switching valve according to a second embodiment of the invention, in a switching position taken when its solenoid is OFF. It should be noted that in FIG. 5, component parts and elements similar or equivalent to those of the four-way switching valve shown in FIG. 1 are designated by identical reference numerals, and detailed description thereof is omitted.

The four-way switching valve according to the second embodiment is distinguished from the four-way switching valve according to the first embodiment in its further enhanced heat insulating effects. That is, a heat-insulating sleeve 34a formed of a material having a low thermal conductivity, e.g. a resin is arranged inside the passage via which the high-temperature high-pressure refrigerant is introduced from the port A, and heat-insulating sleeves 35a, 36a similarly formed of the resin are arranged inside the cylinders in which the plugs 2, 4 are arranged. Further, heat-insulating sleeves 37, 38 similarly formed of the resin are arranged inside the cylinders in which the pistons 3, 5 are arranged. These heat-insulating sleeves 37, 38 integrate the functions of the plugs 12, 13 of the four-way switching valve according to the first embodiment.

This thermally insulates the inside of the passage into which the high-temperature high-pressure refrigerant is introduced from the port A and the two cylinders, from the body 1, thereby suppressing transfer of heat of the refrigerant introduced from the port A to the low-temperature refrigerant flowing through the port D. This makes it possible to reduce heat loss within the four-way switching valve The four-way switching valve constructed above operates similarly to that according to the first embodiment, when its solenoid is turned ON or Off.

Figure 6:
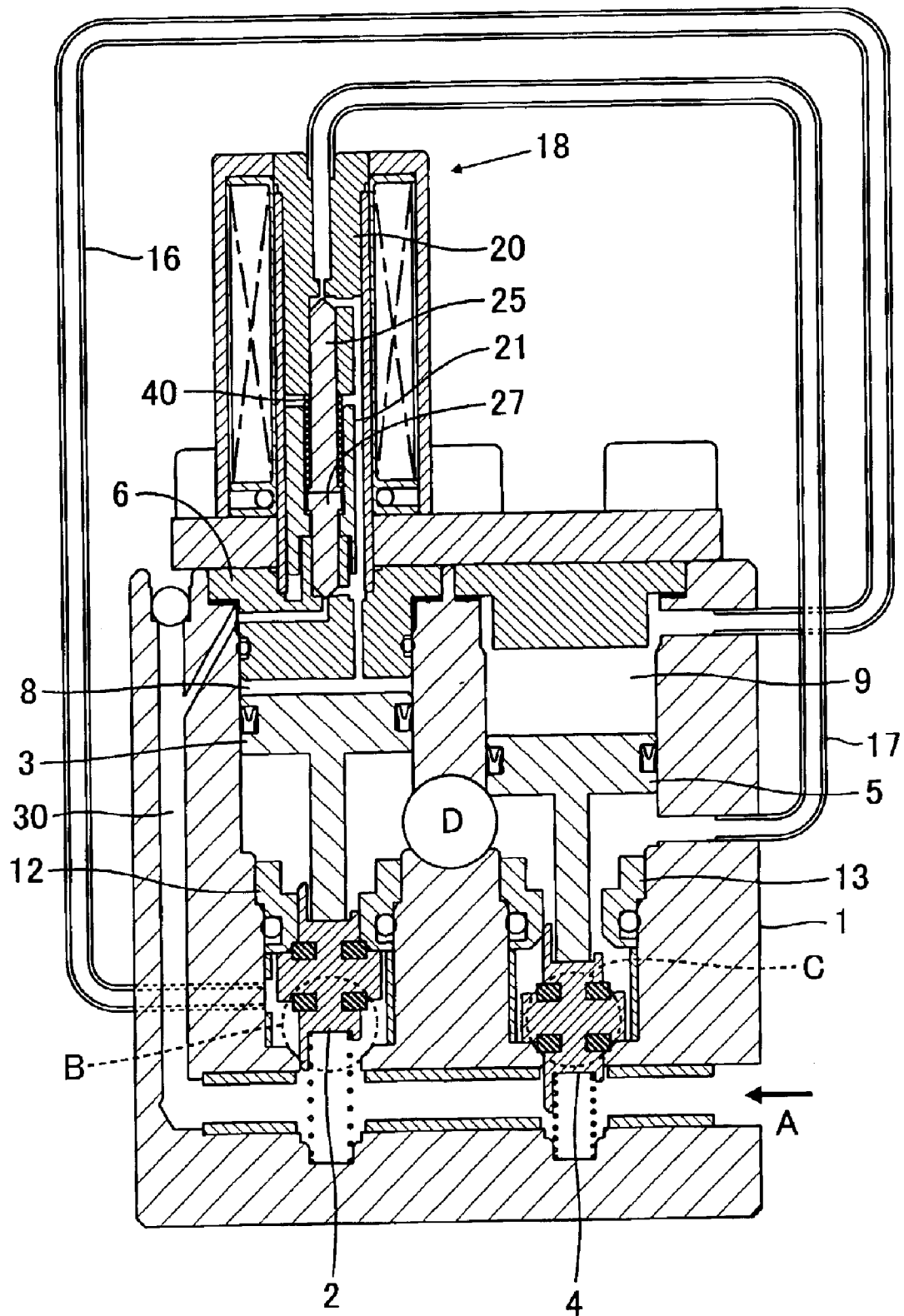
FIG. 6 is a longitudinal sectional view of a four-way switching valve according to a third embodiment of the invention, in a switching position taken when its solenoid is OFF.
Figure 7:
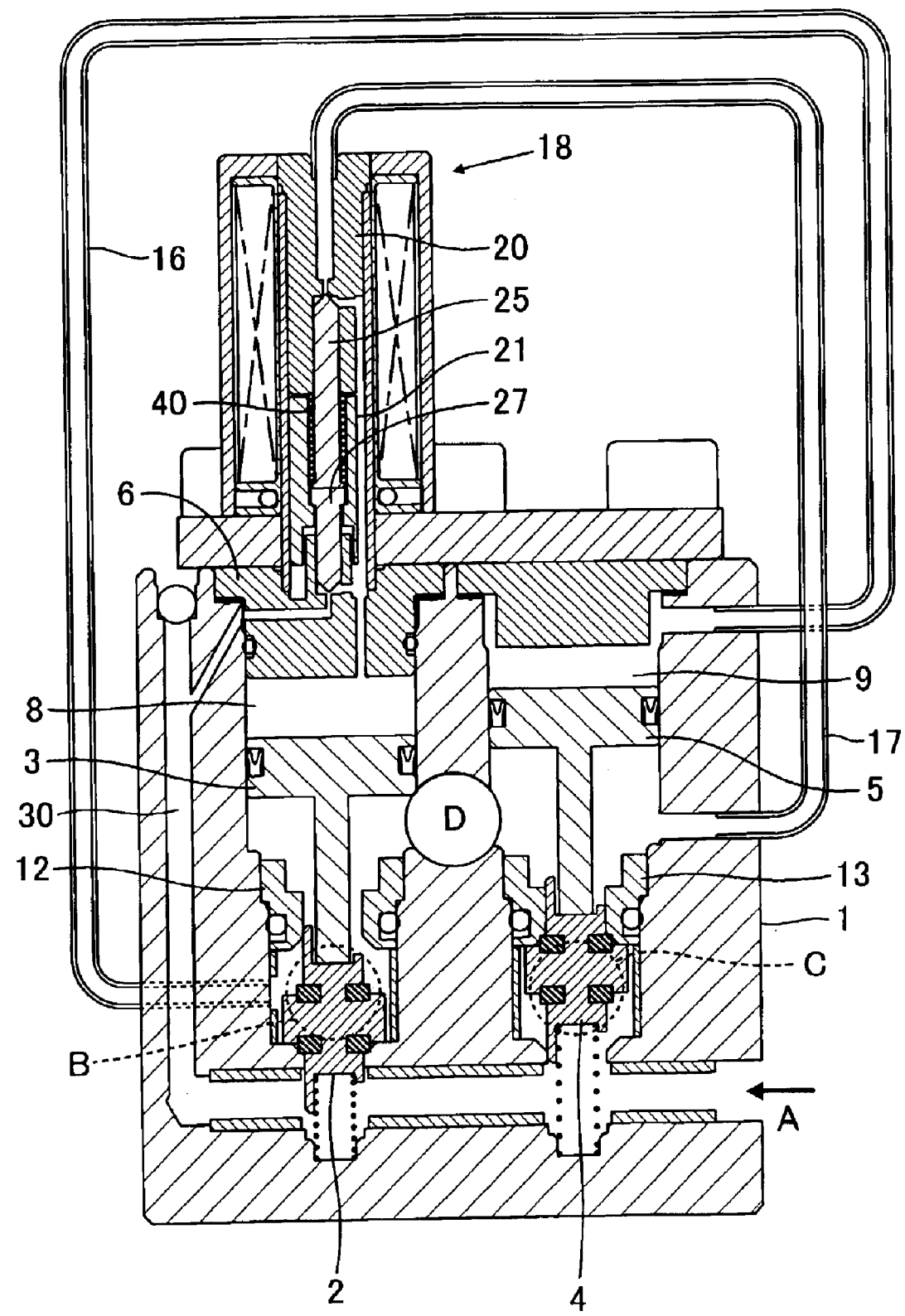

FIG. 6 is a longitudinal sectional view of a four-way switching valve according to a third embodiment of the invention, in a switching position taken when its solenoid is OFF. FIG. 7 is a longitudinal sectional view of the four-way switching valve according to the third embodiment of the invention, in a switching position taken when its solenoid is ON. It should be noted that in FIGS. 6 and 7, component parts and elements similar or equivalent to those of the four-way switching valve shown in FIG. 1 are designated by identical reference numerals, and detailed description thereof is omitted.

The four-way switching valve according to the third embodiment is distinguished from that according to the first embodiment in that the construction of the three-way solenoid valve 18 is modified. That is, the three-way solenoid valve 18 of the four-way switching valve urges the needles 25, 27 as two separate members and the plunger 21 by a single spring 40.

The needles 25, 27 are arranged such that respective opposed end faces thereof are in contact with each other, and the spring 40 is arranged between the flange of the needle 25 and the core 20. The spring 40 urges the upper needle 25 in a direction away from the valve seat associated therewith, and the upper needle 25 urges the lower needle 27 in a direction of seating the needle 27 on the valve seat associated therewith. Further, the lower needle 27 urges the plunger 21 latched by the flange thereof in a direction away from the core 20. This makes it possible to integrate the two springs 24, 28 of the three-way solenoid valve 18 of the four-way switching valve according to the first embodiment into the single spring 40, and dispense with the stopper 26 for pulling the upper needle 25 downward according to the downward motion of the plunger 21, whereby the cost can be reduced.

In this three-way solenoid valve 18 as well, the valve element is formed by the two separate parts, i.e. the needles 25, 27, and valve seats and valve holes respectively associated with the needles 25, 27, and members for guiding the needles 25, 27 in a direction toward and away from the valve seats are formed by respective single components (core 20, plug 6), whereby the needles 25, 27 and their valve seats can be arranged substantially on the same axis.

In the four-way switching valve constructed as above, when the three-way solenoid valve 18 is in a deenergized state, i.e. when its solenoid is OFF, as shown in FIG. 6, the plunger 21 of the three-way solenoid valve 18 is urged by the spring 40 and moved downward, as viewed in the figure, whereby the upper needle 25 is moved away from the valve seat associated therewith, while the lower plunger 27 is seated on the valve seat associated therewith. Thus, the three-way solenoid valve 18 causes the pressure control chamber 8 to be communicated with the low-pressure port D via the tube 17, and disconnected from the high-pressure port A.

This causes the plug 2 to be pushed upward by the high-pressure refrigerant introduced into the port A, and thereby seated on the plug 12 to establish communication between the port A and the port B, and block communication between the port B and the port D. At the same time, the high-pressure refrigerant is introduced into the pressure control chamber 9 via the tube 16, whereby the piston 5 causes the plug 4 to be pushed downward and seated on the valve seat formed in the body 1 to establish communication between the port C and the port D, and block communication between the port C and the port A. Thus, the heating and cooling system for an automotive vehicle is placed in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, when the solenoid is turned ON, as shown in FIG. 7, the three-way solenoid valve 18 has the plunger 21 thereof attracted to the core 20 against the urging force of the spring 40, so that the upper needle 25 blocks the passage to the tube 17, while the lower needle 27 opens to introduce the high-pressure refrigerant into the pressure control chamber 8.

Due to introduction of the high-pressure refrigerant into the pressure control chamber 8, the piston 3 causes the plug 2 to be pushed downward and seated on the valve seat formed in the valve body 1 to block the communication between the port A and the port B and establish communication between the port B and the port D. Further, the pressure in the pressure control chamber 9 is reduced via the tube 16, so that the high-pressure refrigerant introduced from the port A causes the plug 4 to be moved upward and seated on the plug 13, to thereby establish communication between the port C and the port A, and block communication between the port C and the port D. Thus, the heating and cooling system for an automotive vehicle is switched to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

Figure 8:
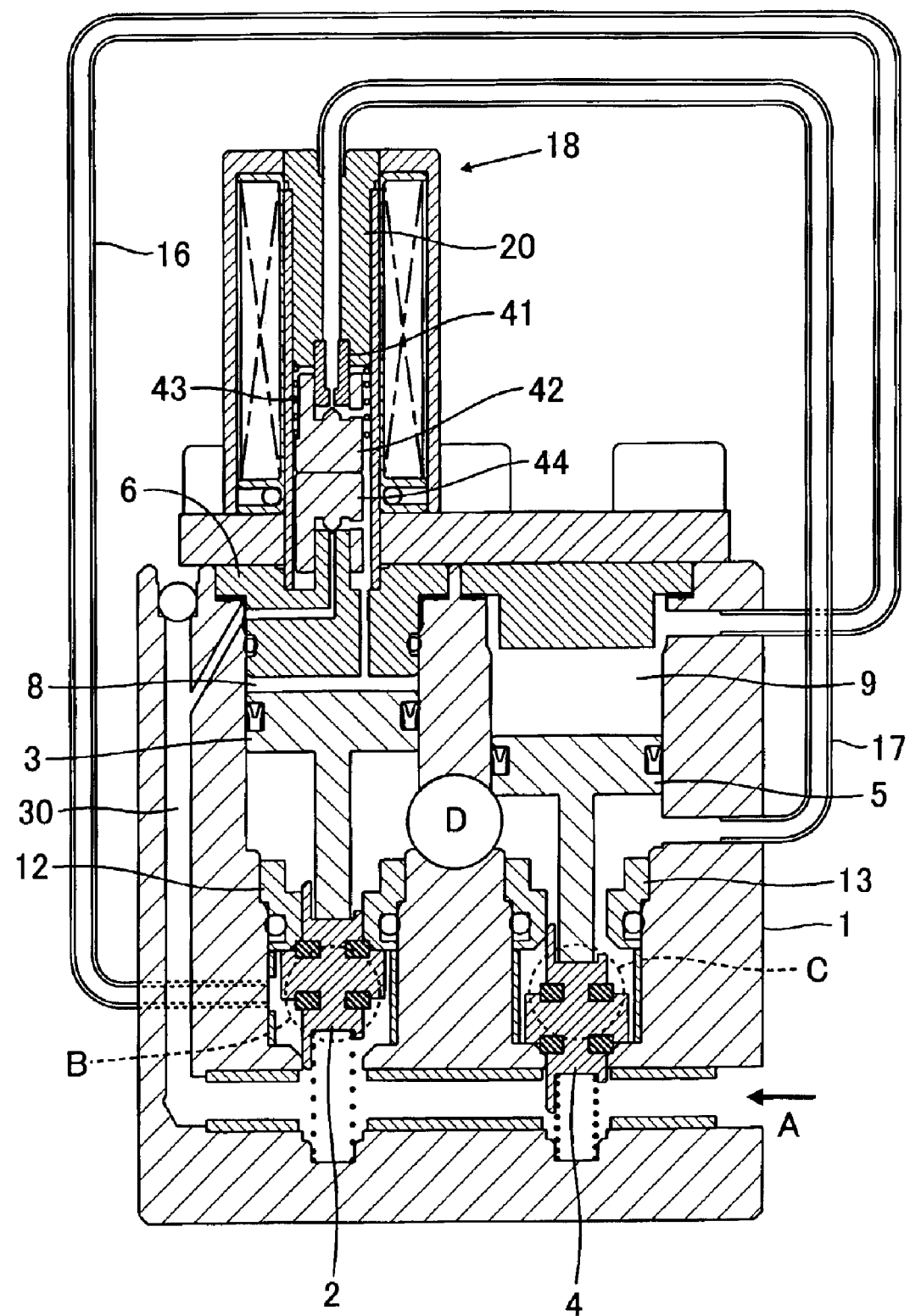
FIG. 8 is a longitudinal sectional view of a four-way switching valve according to a fourth embodiment of the invention, in a switching position taken when its solenoid is OFF.
Figure 9:
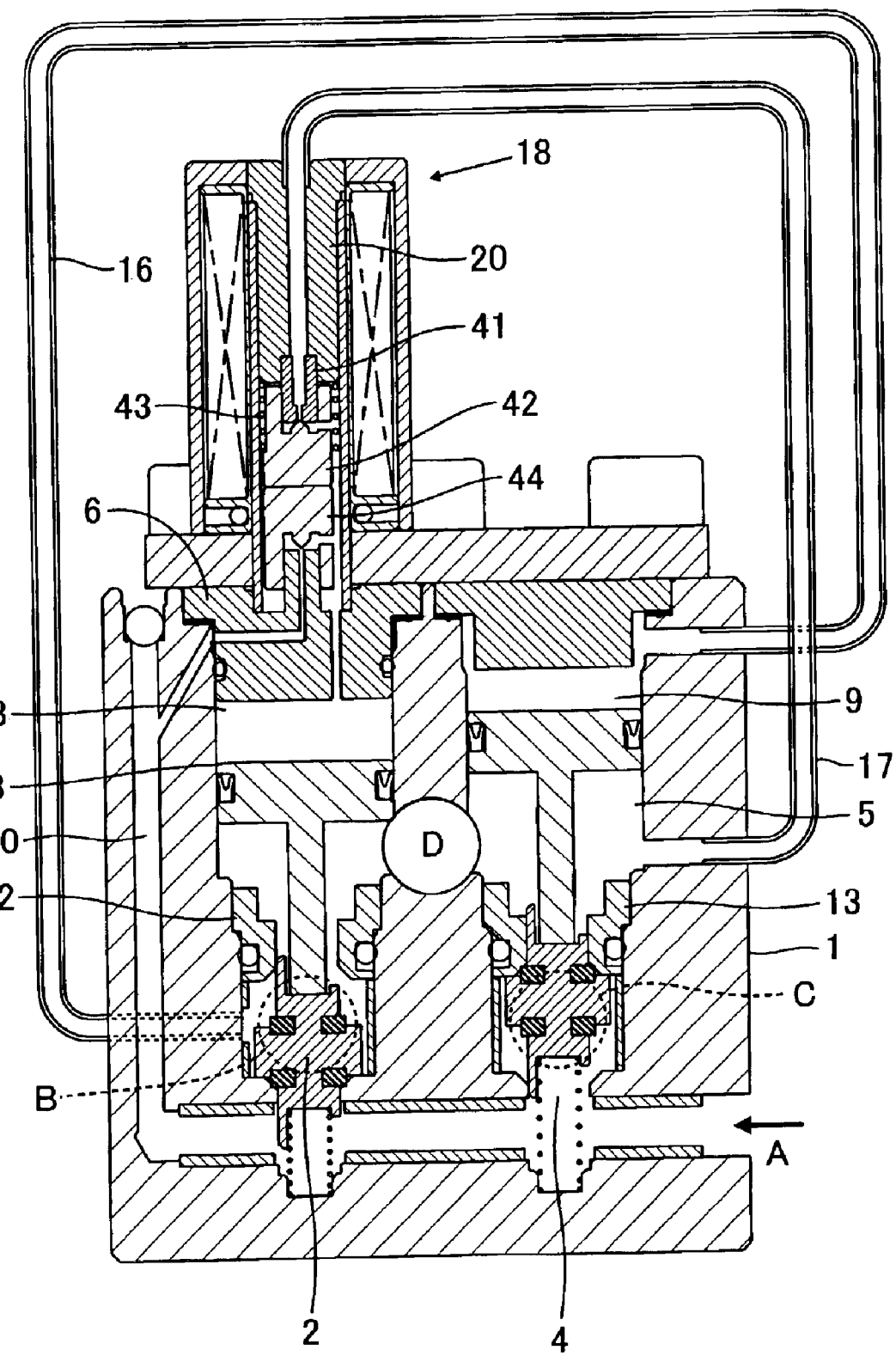
Figure 10:
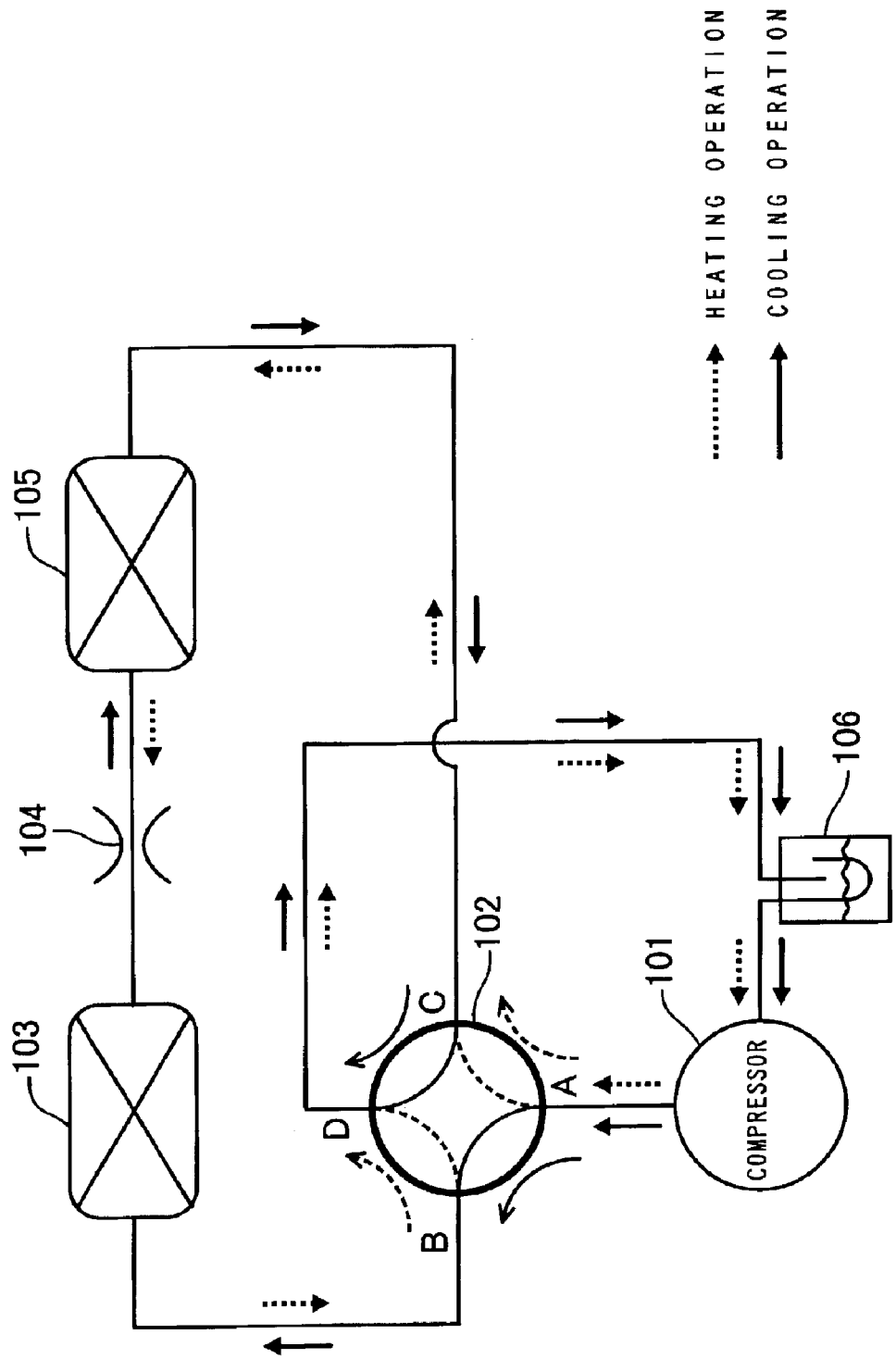
FIG. 10 is a diagram showing the arrangement of a heating and cooling system using a four-way switching valve.

FIG. 8 is a longitudinal sectional view of a four-way switching valve according to a fourth embodiment of the invention, in a switching position taken when its solenoid is OFF. FIG. 9 is a longitudinal sectional view of the four-way switching valve according to the fourth embodiment of the invention, in a switching position taken when its solenoid is ON. It should be noted that in FIGS. 8 and 9, component parts and elements similar or equivalent to those of the four-way switching valve shown in FIG. 1 are designated by identical reference numerals, and detailed description thereof is omitted.

The four-way switching valve according to the fourth embodiment is distinguished from that according to the first embodiment in that the three-way solenoid valve 18 is configured such that the plunger 21 is divided into two separate portions which are caused to have the functions of the needles 25, 27, respectively, and are urged by a single spring, and at the same time, a guide having a valve seat and a valve hole is held from the inside, instead of being held from the outside. More specifically, a plug 41 serving as a guide and a valve seat is fitted in an lower end opening of the refrigerant passage of the core 20. This plug 41 is made from a non-magnetic material, thereby preventing attraction characteristics of the core 20 from being changed due to a change in the shape thereof. Arranged below the core 20 is a plunger 42 in a manner capable of axial reciprocating motion with the plug 41 as the guide. The plunger 42 has a conical projection forming a valve element opposed to a lower end face of the plug 41. Interposed between the plunger 42 and the core 20 is a spring 43 for urging the plunger 42 in a direction away from the plug 41. Arranged below the plunger 42 is a plunger 44 which is capable of axial reciprocating motion using a hollow cylindrical projection formed on the plug 6 as the guide. The hollow cylindrical projection of the plug 6 has a valve seat formed on an upper end face thereof, and a conical projection is integrally formed with the plunger 44 such that the projection forms the valve element opposed to the valve seat.

In the four-way switching valve constructed as above, when the three-way solenoid valve 18 is in a deenergized state, i.e. when its solenoid is OFF, as shown in FIG. 8, the plungers 42, 44 of the three-way solenoid valve 18 are urged by the spring 43, whereby they are moved downward as viewed in the figure, while being guided by the plug 41 and the hollow cylindrical projection of the plug 6. This causes the conical projection on the upper plunger 42 to be moved away from the valve seat of the plug 41, while the lower plunger 44 is seated on the valve seat of the hollow cylindrical projection formed on the plug 6. Thus, the three-way solenoid valve 18 causes the pressure control chamber 8 to be communicated with the low-pressure port D via the tube 17, and disconnected from the high-pressure port A.

This causes the plug 2 to be pushed upward by the high-pressure refrigerant introduced into the port A, and seated on the plug 12 to establish communication between the port A and the port B, and block communication between the port B and the port D. At the same time, the high-pressure refrigerant is introduced into the pressure control chamber 9 via the tube 16, whereby the piston 5 causes the plug 4 to be pushed downward and seated on the valve seat formed in the body 1 to establish communication between the port C and the port D, and block communication between the port C and the port A. Thus, the heating and cooling system for an automotive vehicle is placed in the cooling operation mode in which the high-pressure refrigerant delivered from the compressor and received via the port A is allowed to flow from the port B to the external heat exchanger, and the refrigerant delivered from the internal heat exchanger and received via the port C is allowed to flow from the port D to the compressor.

Next, when the solenoid is turned ON, as shown in FIG. 9, the three-way solenoid valve 18 has the plungers 42, 44 thereof attracted to the core 20 against the urging force of the spring 43, so that the upper plunger 42 is seated on the plug 41 to block the passage to the tube 17, while the lower plunger 44 is moved away from the valve seat associated therewith to establish communication with the high-pressure passage 30 to thereby introduce the high-pressure refrigerant into the pressure control chamber 8.

Due to introduction of the high-pressure refrigerant into the pressure control chamber 8, the piston 3 causes the plug 2 to be pushed downward and seated on the valve seat formed in the valve body 1 to block the communication between the port A and the port B and establish communication between the port B and the port D. Further, the pressure in the pressure control chamber 9 is reduced via the tube 16, so that the high-pressure refrigerant introduced from the port A causes the plug 4 to be moved upward and seated on the plug 13, to thereby establish communication between the port C and the port A, and block communication between the port C and the port D. Thus, the heating and cooling system for an automotive vehicle is switched to the heating operation mode in which the high-pressure refrigerant delivered from the compressor and received via the port A is allowed to flow from the port C to the internal heat exchanger, and the refrigerant delivered from the external heat exchanger and received via the port B is allowed to flow from the port D to the compressor.

It should be noted that in the first to fourth embodiments described above, the tube 16 is employed to provide piping between the space in which the plug 2 is arranged and the pressure control chamber 9, this is not limitative but a refrigerant passage may be formed in a portion of the body 1 avoiding the ports A to D and the cylinders, for communication between the space in which the plug 2 is arranged and the pressure control chamber 9.

As described heretofore, according to the present invention, a valve element operating by the action of a plunger is divided in two separate valve elements, and a valve seat associated with each valve element and a guide for guiding the valve element when the valve element is seated are formed integrally with each other, as a single component. This makes it possible to form the valve hole and the guide by a single component such that they are substantially concentric. Therefore, when the valve element is seated, it is possible to guide the valve element in a state in which the concentricity of the valve element with the valve seat is maintained, thereby imparting sufficient sealing properties to the valve portion when the valve is closed.

In the configuration in which a spring is arranged between the two separate valve elements, the valve closed state effected by seating of the valve is maintained by the urging force of the spring, which makes it possible to absorb a shock occurring when the valve is seated, whereby the durability of the valve is improved.

The foregoing is considered as illustrative only of the principles of the present invention. Further, wince numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A four-way switching valve including a first plug and a second plug arranged in a first cylinder and a second cylinder formed in a body in parallel with each other, respectively, such that the first plug and the second plug are capable of axial reciprocating motion, the first plug and the second plug each having axially both ends forming valve elements and performing switching of fluid passages, a first piston and a second piston for actuating the first plug and the second plug, respectively, and a three-way solenoid valve causing a pressure control chamber for the first piston to be selectively communicated with a space into which high-pressure fluid is introduced or a space into which low-pressure fluid is introduced, characterized in that:

the three-way solenoid valve comprises:
a first valve element and a second valve element arranged in an axial direction of a plunger as respective two separate parts, for reciprocating motion;
a first valve seat having a guide for guiding said first valve element and a valve hole concentric with said guide both arranged at respective axial positions of the plunger; and
a second valve seat having a guide for guiding said second valve element and a valve hole concentric with said guide both arranged at respective axial positions of the plunger.

2. The four-way switching valve according to claim 1, wherein said first valve element and said second valve element are formed as needles, and wherein said first valve seat is integrally formed with a core, and wherein said second valve seat is integrally formed with a closing plug that closes the first cylinder to define the pressure control chamber between the first piston and itself.

3. The four-way switching valve according to claim 2, wherein said first valve element and said second valve element have opposed ends thereof being positioned within the plunger in a state in which axial motion thereof is restricted such that when one of said first valve element and said second valve element is closed, the other of said first valve element and said second valve element is open, and at the same time, said first valve element and said second valve element are urged by a spring in axially outward directions.

4. The four-way switching valve according to claim 2, wherein said first valve element and said second valve element have opposed ends thereof being positioned within the plunger in a state in which axial motion thereof is restricted such that when said first valve element is closed, said second valve element is open, and at the same time, are urged in a direction of closing said second valve element by a spring for urging the plunger in a direction away from said core.

5. The four-way switching valve according to claim 2, wherein said closing plug has a strainer arranged in a portion thereof opening to communicate with the valve hole of said second valve seat.

6. The four-way switching valve according to claim 1, wherein said first valve element and said second valve element are formed by a first plunger and a second plunger as two separate members, and wherein said first valve seat is formed by a guide plug which is fitted in a fluid passage formed at an axial position of a core such that said guide plug guides said first plunger and has a valve hole at an axial position thereof, and wherein said second valve seat is formed by a hollow cylindrical projection integrally formed with a closing plug that closes the first cylinder to define a pressure control chamber between the first piston and itself, such that said hollow cylindrical projection protrudes in a manner guiding said second plunger, and at the same time having a valve hole at an axial position thereof.

7. The four-way switching valve according to claim 6, wherein said closing plug has a strainer arranged in a portion thereof opening to communicate with the valve hole of said second valve seat.

8. The four-way switching valve according to claim 1, wherein heat-insulating members are arranged inside the fluid passages switched by the first plug and the second plug.

* * * * *